June 18, 1963 T. N. HULL, JR., ETAL 3,094,309
ENGINE ROTOR DESIGN
Filed Dec. 16, 1959 2 Sheets-Sheet 1
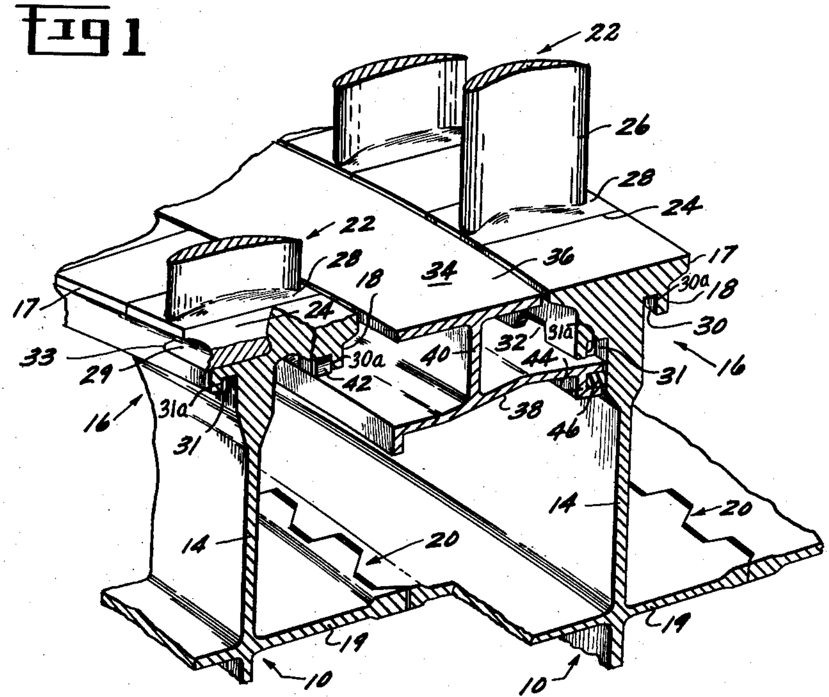
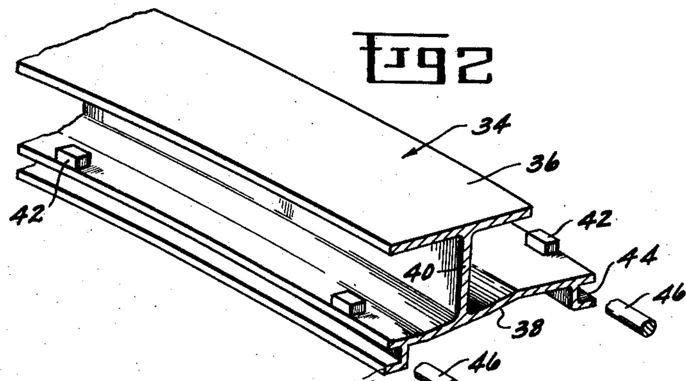
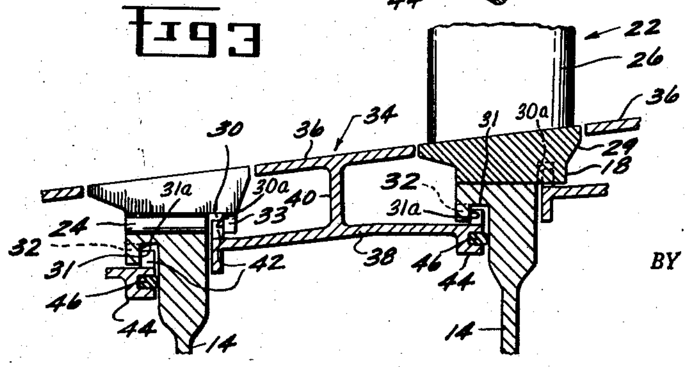
INVENTORS.
THOMAS N. HULL, JR.
BY CLARENCE E. LE BELL
Harry C. Burgess
ATTORNEY- June 18, 1963 T. N. HULL, JR., ETAL 3,094,309
ENGINE ROTOR DESIGN
Filed Dec. 16, 1959 2 Sheets-Sheet 2
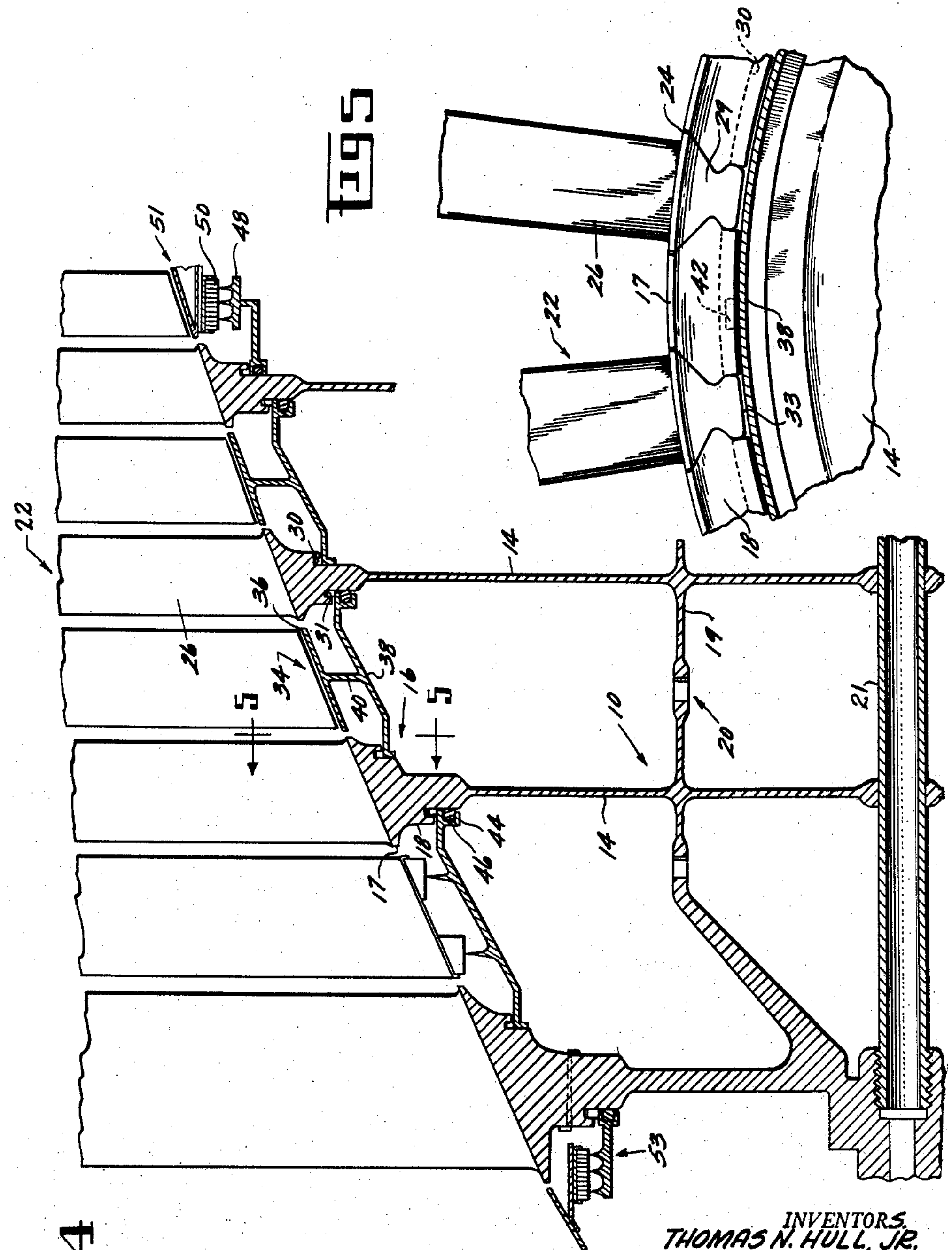
INVENTORS.
THOMAS N. HULL, JR.
BY CLARENCE E. LE BELL
Harry C. Burgess
ATTORNEY United States Patent Office 3,094,309
Patented June 18, 1963

1

3,094,309
ENGINE ROTOR DESIGN
Thomas Neil Hull, Jr., Marblehead, and Clarence Edgar Le Bell, Peabody, Mass., assignors to General Electric Company, a corporation of New York
Filed Dec. 16, 1959, Ser. No. 859,974
1 Claim. (Cl. 253—39)

This invention relates to an axial-flow turbomachine rotor having a plurality of axially-spaced wheel disks and spacer rings and, more particularly, to a bayonet-type connection for the disks and rings.

In a typical multi-stage axial-flow turbomachine rotor, the main portion of the rotor assembly may comprise a series of axially-spaced wheel disks having a plurality of buckets or blades mounted on the rims thereof. To locate the disks radially about the axis of the rotor it is customary to use a shaft connected by face clutch couplings, such as radially-extending teeth or pins. A center bolt received through a center hole in each disk can then be used to compress the disks and shaft to form the rotor assembly.

Some means, however, must also be provided adjacent the rims to maintain the disks in a predetermined axial location. Usually this takes the form of a series of spacer rings of approximately the same diameter as the adjacent disk rims. Portions of the rings acting in conjunction with the blade platforms and the disk rims may also be utilized to form the fluid flow path in the turbomachinery.

Where lightweight and maintenance accessibility, among other things, are important, it is desirable to design a rotor having a minimum number of easily assembled parts. Due to the presence of centrifugally-induced stresses and high operating temperatures adjacent the rim areas of the rotor, however, the disks and, more particularly, the spacer rings necessarily must have a certain rigidity and inherent physical strength. To obtain this strength, therefore, it his been customary in the past to rigidly affix the spacer rings to the wheel disks by bolting, welding, riveting, etc. In such cases either one or both edges of the rings may be so affixed. Still another method has been to shrink-fit the rings on the rotor disk rims.

Such methods of rotor construction have certain inherent disadvantages because of the fact that, among other things, the spacer rings and the disk rims usually do not have the same rates of expansion. Also, when they are rigidly connected, destructive vibrations may occur in the rings and/or the disks under certain operating conditions. Lastly, relatively massive rings may impress undesirably heavy radial loads on the wheel disks.

Therefore, to provide a lightweight, easily assembled and disassembled rotor, it would be desirable to have a spacer ring and disk connection which would insure the necessary support for a ring of sufficient strength, but would not impose excessive loads on the wheel disks during operation of the rotor. In addition, such a connection should have means for axially locating the disks, and for holding them in this predetermined axial position, while, at the same time, providing for possible unequal rates of expansion of the disks and the rings. Finally, for reasons of maintenance and accessibility, the connection should be as simple and uncomplicated as possible.

Accordingly, an object of our invention is to provide a simple, easily assembled ring and disk connection for an axial-flow turbomachine rotor having a plurality of wheel disks and spacer rings.

A further object of our invention is to provide a simple, easily assembled ring and disk connection for an axial-flow turbomachine rotor which axially locates the disks in a predetermined position and also provides the necessary radial support for the rings.

Another object of our invention is to provide a simplified

2 spacer ring and wheel disk connection for an axial-flow turbomachine rotor which axially locates the disks in a predetermined position and provides radial support for the rings, yet does not result in excessive loads being impressed on the disks by the rings nor require a complicated and time-consuming procedure for assembly or disassembly of the rotor.

Briefly, our invention comprises a bayonet-type ring and disk connection for use with an axial-flow turbomachine rotor having a plurality of axially-spaced wheel disks with spacer rings therebetween.

While the specification concludes with claims specifically pointing out and distinctly claiming the subject matter of our invention, it is believed our invention will be better understood and other objects and advantages become more apparent by the following description taken in conjunction with the drawings, in which:

FIG. 1 is a pictorial view, partially in section, of a segment of the rim area of a typical axial-flow turbomachine rotor illustrating a spacer ring attached to a pair of disk members by means of our novel bayonet-type connection;

FIG. 2 is a pictorial view showing a portion of a spacer ring and part of the bayonet-type connection;

FIG. 3 is a side elevation, partly in cross-section, showing means for locking the bayonet-type connection once the ring and disks are assembled;

FIG. 4 is a side elevation, partly in cross-section, of a typical turbomachine rotor assembly utilizing our invention; and FIG. 5 is a view taken along lines 5—5 of FIG. 4 and showing a segment of the rim area.

Referring now to FIG. 1 of the drawings, shown therein are segments of a pair of axially-spaced wheel disks, indicated generally at 10—10, of an axial-flow turbomachine rotor. Each disk includes a radially-extending web portion 14 and an enlarged rim, indicated generally at 16. The outermost portion 17 of the disk rim overhangs an undercut portion 18 on each side of the wheel disk. Extending on either side of the web portion 14 is a cylindrical flange 19 adapted to abut a like flange on an adjacent disk to form the rotor shaft. These flanges locate the disks radially by means of suitable connections, such as the face clutch couplings, shown generally at 20, or by means of radial teeth or pins. A center-bolt 21 is used to compress the disks and the shaft to form the rotor assembly, the compression causing axial loading and frictional engagement of the teeth of the face clutch coupling 20. The interengagement of the teeth prevents radial movement of the disks relative to each other.

A plurality of blades, some of which are indicated generally at 22, are adapted to be mounted on the disks in axially-extending slots 24 provided in the rims 16. Each blade includes an airfoil portion 26, a platform portion 28, and a base portion 29, the latter being adapted to be received in a slot 24.

Indicated generally at 34, in FIG. 2, is a spacer ring adapted to fit between the disk rims 16. The spacer ring comprises an outer ring portion 36, an inner ring portion 38, and a central web portion 40 joining the inner and outer portions and being generally perpendicular thereto. The outer ring portion 36 is adapted to cooperate with the overhanging disk rim portion 17 and the blade platforms 28 to form a fluid flow path in the rotor, and the inner ring portion 38 is adapted to support and locate a part of the novel bayonet-type connection described below.

The bayonet-type spacer ring and wheel disk connection, which is the subject of our invention, includes portions located on both the disk and the spacer ring. On the disk these are: an annular groove 30 in the undercut portion 18 of the enlarged disk rim 16 on the downstream side of the disk; a similar groove 31 on the upstream side of the rim; a series of openings or notches 32 in the upstream radially-extending wall 31*a* of the groove 31; and a series of notches 33 formed by the blade slots 24 of the disk intersecting the downstream radially-extending wall 30*a* of the annular groove 30. And on the ring, the remaining portion of the bayonet-type connection consists of a plurality of circumferentially-spaced locating and supporting lugs 42 positioned along the outer edges, fore and aft, of the upper surface of the inner ring portion 38, the lugs being adapted to be received in the notches or openings 32 and 33 to enable the rotor to be assembled in a manner described below.

The notches 32 in the upstream groove wall 31*a* may be placed in alignment with the notches, or slot continuations 33 in the downstream groove wall 30*a*, or they may be offset to a certain extent. Obviously, then, the lugs 42 will also have to be either axially aligned or staggered depending on the disposition of these notches. The axial widths of the grooves 30 and 31 are also such that the lugs 42 will be freely moveable therein with slight but sufficient clearance being provided between the groove walls and the lugs for a purpose hereinafter described. The underside of the inner or connecting ring portion 38 of the spacer may also support one or more L-shaped flanges 44—44 adapted to receive O rings 46—46 for sealing of the rotor, if this is found to be necessary.

The invention will perhaps be better understood by reference to FIGS. 3, 4, and 5 and a description of the assembling of a turbomachine rotor, in this case, a rotor for use in an axial-flow compressor, utilizing our invention. Initially, all rotating parts should be balanced before assembly. Preferably the rotor is assembled from the rear forward, i.e., the last stage is assembled first. By referring to FIG. 4, it will be seen that the last stage spacer ring is in the form of a rotating seal 48 adapted to cooperate with a stationary seal 50 supported by the compressor outlet nozzle frame, indicated generally at 51. After the lugs on the seal 48 have been inserted in the last stage disk groove 30, one or more of the last stage rotor blades 22 are inserted in the axial slots 24. This locks the sealing ring 48 from rotating with respect to the disk since, as mentioned above, the slots 24 will extend transversely of the disk rim and intersect the groove 30 to form the openings 33 in the groove wall. Thus, when the sealing ring lugs attempt to ride back towards the openings they will contact the blade bases 29, then in the groove, and be prevented from doing so. This is perhaps better illustrated in FIG. 5, which shows the relative positions of the lugs and blades after assembly.

After all the last stage blades have been inserted, the next to last stage spacer ring is then inserted in the last stage disk by placing the lugs 42 in the openings 32. With the lugs still in position in the openings, i.e., before the spacer ring is rotated with respect to the last stage disk, the next to last stage disk is coupled, as at 20, to the last stage disk, the lugs 42 on the upstream side of the spacer 34 being received in the openings 33 in the outermost wall of the downstream groove 30. The spacer ring then is rotated with respect to both disks to obtain the bayonet-type locking action. The next to last stage locking blades are then inserted to lock the next to last stage spacer ring from further rotation with respect to either disk. This locking action may be accomplished through use of one or more than one of the entire series of blades mounted on each disk. Each of the succeeding spacer rings and disks are then assembled in turn, by repeating the process explained above. The blades may be held in place in the slots by any one of a number of commonly known methods, such as a locking strip, calking, or the like.

The first stage sealing ring, indicated generally at 53, is then inserted and locked by suitable means to the first stage wheel disk. The rotor center bolt (not shown) can then be inserted and tightened to set the axial load as determined by measuring the bolt extension. The rotor is then balanced and run out checked.

From the above description it will be realized that the spacer rings are located radially by the disk wheels at a selected number of points determined by the number and spacing of lugs 42. The lugs support the rings and while the number of lugs must be sufficient to provide adequate support, the spacing of the lugs is dictated by balance considerations. While there may be slight radial clearance between the lugs 42 and the outermost axially extending surfaces of the grooves 30 and 31 during assembly, the clearance is closed due to "hoop tension" created in the ring by centrifugal force during turbomachine operation. Once the lugs 42 contact the outermost axially extending surfaces of the grooves, the rings are located radially at the points of contact. With the rings thus being located radially at multiple points, large radial growths of the rings may occur without excessive loads being imposed on the wheel disks, yet the rings will hold the disk rims in the proper axial location by reason of the interlocking bayonet connections. The only restriction on the spacer rings will be the contact with the blade base at the multiple points restricting rotation of the rings relative to the disks, and the rubbing action of the O rings, if they are used. Obviously, the rotor could also be designed with the radial fit between the disks and the spacers reversed, if so desired.

In summary, the above-described novel bayonet-type connection makes possible a stable, lightweight, easily put together rotor assembly for use in axial-flow turbojet or turboprop engines.

What we claim as new and novel and desire to obtain by Letters Patent is:

A rotor for a multi-stage axial-flow turbomachine, said rotor comprising: a plurality of thin walled disks, axially projecting flange means on each of said disks near the center thereof, said flange means on adjacent ones of said disks abutting in interengaging relation, a clamping bolt positioned through the center of said disks, means for tensioning said bolt so as to cause compression of said rotor, said flange means absorbing said compression load and locating said disks in the radial direction, an enlarged rim portion containing a plurality of circumferentially-spaced axially-extending slots; a plurality of blades mounted in said slots; a plurality of spacer rings positioned between said disks adjacent the rims thereof, said rings and disks being joined by oppositely-disposed bayonet-type connections, each connection comprising an inwardly opening annular groove in undercut portions of each disk, a plurality of circumferentially-spaced lugs carried on axially-extending portions of each spacer ring, a series of notches in the radially-extending walls of each of said annular grooves, said notches being so spaced and dimensioned that said lugs will pass therethrough and into said grooves, the grooves having axial widths such that the lugs will move freely therein on rotation of said rings, said lugs being retained in said grooves by the base of at least one of said blades extending into at least one of said grooves subsequent to rotation of the ring to prevent further rotation of the ring, said connections being constructed and arranged to axially locate said disks in said rotor and provide radial support for the rings at predetermined multiple points so that only relatively small radial loads will be impressed on said disks by said spacer rings during rotor operation.

References Cited in the file of this patent

UNITED STATES PATENTS

| | | |
|---|---|---|
| 2,452,782 | McLeod et al. | Nov. 2, 1948 |
| 2,530,477 | Ostmar | Nov. 21, 1950 |
| 2,579,745 | Lombard et al. | Dec. 25, 1951 |
| 2,689,682 | Boyd et al. | Sept. 21, 1954 |
| 2,773,667 | Wheatley | Dec. 11, 1956 |
| 2,908,518 | Gregory | Oct. 13, 1959 |
| 2,916,256 | Welch | Dec. 8, 1959 |
| 2,928,652 | Shapiro | Mar. 15, 1960 |

FOREIGN PATENTS

| | | |
|---|---|---|
| 543,281 | Belgium | Dec. 30, 1955 |